United States Patent Office 3,671,293
Patented June 20, 1972

3,671,293
THERMOSETTING ACRYLIC ENAMEL CONTAINING MINOR AMOUNTS OF CELLULOSE ACETATE BUTYRATE
Leonard A. Walle, Flint, Mich., assignor to E. I. du Pont de Nemours and Company, Wilmington, Del.
No Drawing. Continuation of abandoned application Ser. No. 780,191, Nov. 29, 1968. This application Jan. 8, 1971, Ser. No. 105,062
Int. Cl. B44d 1/38; C08b 21/14; C08g 37/32
U.S. Cl. 117—74
10 Claims

ABSTRACT OF THE DISCLOSURE

A thermosetting enamel coating composition in which the film-forming material is a blend of the following polymers:
(1) an acrylic polymer of 0–6% by weight of an $\alpha,\beta$-ethylenically unsaturated monocarboxylic acid, an acrylic ester of an alkyl methacrylate or an alkyl acrylate, or a combination thereof, 0–50% by weight of styrene and a hydroxyalkyl methacrylate or a hydroxyalkyl acrylate;
(2) a minor amount of cellulose acetate butyrate; and
(3) a thermosetting nitrogen containing resin.

This application is a continuation of Ser. No. 780,191, now abandoned.

BACKGROUND OF THE INVENTION

This invention relates to thermosetting acrylic enamels and in particular to a thermosetting acrylic enamel which when used as an exterior coating for autos and trucks can be repaired and recoated readily with a lacquer.

Thermosetting acrylic coating compositions as shown in Frazier et al. U.S. Pat. 2,681,897, issued June 22, 1954; Vasta U.S. Pat. 3,338,860, issued Aug. 29, 1967; Fisk et al. U.S. Pat. 3,365,414, issued Jan. 23, 1968; are excellent enamel coating compositions which are very adequate for many uses but these enamels generally cannot be adequately spot repaired or recoated with a lacquer unless the substrate first is sanded or a sealer coat is applied to provide adhesion to the enamel substrate.

Thermosetting primer compositions containing cellulose acetate butyrate are shown in Porter U.S. Pat. 3,276,905, issued Oct. 4, 1966. But these highly pigmented primer compositions cannot be used as a topcoat.

There is a great need in the auto industry for a thermosetting acrylic coating composition that can readily be repaired or recoated without preparing the surface by sanding or applying a sealer coat. A thermosetting acrylic coating composition to which stripes and other decorations can be applied without treating the surface of the enamel coating also would be useful.

The novel thermosetting enamel coating composition of this invention can be repaired, for example, with an acrylic lacquer or a nitrocellulose lacquer without the preparation steps of sanding or applying a sealer coat which is required by prior art enamel coatings. The applied repair coat has excellent adhesion to the novel enamel coating composition of this invention. Also, without preparing the novel enamel, coating stripes and other decorations can be applied which are often required on autos and trucks. These decorations also have excellent adhesion to the novel enamel coating composition of this invention.

STATEMENT OF THE INVENTION

The liquid coating composition of this invention comprises 10–60% by weight of a polymer blend and a solvent for the polymer blend, in which the blend consists essentially of (1) 50–80% by weight, based on the weight of the polymer blend, of an acrylic polymer of a mixture which consists essentially of 0–6% by weight, based on the weight of the acrylic polymer, of an $\alpha,\beta$-ethylenically unsaturated monocarboxylic acid;
an acrylic ester which is either an alkyl methacrylate or an alkyl acrylate or a mixture of an alkyl methyl acrylate or an alkyl acrylate wherein the alkyl group contains 1–8 carbon atoms; (up to about 50% by weight of the acrylic polymer can consist of styrene which may be substituted for a portion of the acrylic ester) and
a hydroxy containing compound which is either a hydroxyalkyl methacrylate or a hydroxyalkyl acrylate or a mixture thereof, wherein the alkyl group contains 1–8 carbon atoms, and wherein said acrylic polymer has a relative viscosity of 1.04–1.14 measured at 25° C. in ethylene dichloride according to ASTM D–445–46–T, Method B;

(2) 0.5–2% by weight, based on the weight of the polymer blend, of cellulose acetate butyrate having a butyryl content of 35–55% by weight, a hydroxyl content of about 0.8–2.0% by weight and a viscosity of about 0.01–5 seconds measured at 25° C. according to ASTM D–1343–56; and (3) 5–50% by weight based on the weight of the polymer blend of a compatible thermosetting nitrogen containing resin.

DESCRIPTION OF THE INVENTION

Preferably, the novel coating composition of this invention has a polymer solids content of 30–50% by weight and is pigmented and has a pigment volume concentration of about 0.1–20%.

The acrylic polymer is prepared by conventional polymerization techniques in which the monomer constituents are blended with solvents and a polymerization catalyst and heated to 75–100° C. for about 2–6 hours to form a polymer that has a relative viscosity of about 1.04–1.14 and preferably, about 1.06–1.09. The "relative viscosity" is the value obtained by dividing the efflux time of a solution of the polymer by the efflux time of the solvent used to form the above polymer solution. The efflux times are measured according to the procedure of ASTM–D–445–46–T, Method B, using as the polymer solution 0.25 gram of the polymer in 50 cubic centimeters of ethylene dichloride as the solvent. The efflux times are measured at 25° C. in a standard apparatus, sold under the designation of a modified Ostwald viscometer.

Typical solvents and diluents which are used to prepare the acrylic polymer and the novel coating composition of this invention are toluene, xylene, butyl acetate, acetone, methylisobutyl ketone, methylethyl ketone, butyl alcohol, and other aliphatic, cycloaliphatic and aromatic hydrocarbons, esters, ethers, ketones, and alcohols, such as are conventionally used in coated compositions.

About 0.1–4% by weight, based on the weight of the monomers, of a polymerization catalyst is used to prepare the acrylic polymer. Typical catalysts are ditertiary butyl peroxide, cumene hydroperoxide, azobisisobutyronitrile and the like.

The acrylic polymer used in the novel coating composition of this invention contains about 0–6% by weight of an $\alpha,\beta$-ethylenically unsaturated monocarboxylic acid. Typically useful $\alpha,\beta$-ethylenically unsaturated monocarboxylic acids used to prepare the acrylic polymer are acrylic acid, methacrylic acid, crotonic acid and the like.

Preferred are acrylic acid and methacrylic acid since these acids form a high quality polymer.

The acrylic polymer contains about 20–95% by weight of an alkyl methacrylic ester or an alkyl acrylate ester or a mixture of these esters. The alkyl group of the aforementioned esters contains from 1–8 carbon atoms and is of a lower alkyl monohydric alcohol. Typical esters used for the acrylic polymer are methyl methacrylate, ethyl methacrylate, propyl methacrylate, isopropyl methacrylate, butyl methacrylate, octyl methacrylate, ethyl acrylate, propyl acrylate, isopropyl acrylate, butyl acrylate, isobutyl acrylate, hexyl acrylate, 2-ethylhexyl acrylate and the like. Up to about 50% by weight of the acrylic polymer can consist of styrene which is substituted for a portion of the alkyl methacrylate or alkyl acrylate ester.

The acrylic polymer contains 5–20% by weight of a hydroxy containing compound. Typical useful hydroxy containing compounds are hydroxyalkyl acrylates or hydroxyalkyl methacrylates in which the alkyl group contains 1–8 carbon atoms; for example, hydroxyethyl acrylate, hydroxypropyl acrylate, hydroxybutyl acrylate, hydroxyhexyl acrylate, hydroxyoctyl acrylate and the like, hydroxymethyl methacrylate, hydroxyethyl methacrylate, hydroxypropyl methacrylate, hydroxybutyl methacrylate, hydroxyhexyl methacrylate, hydroxyoctyl methacrylate and the like.

One preferred acrylic polymer used to form the novel coating composition of this invention is of methyl methacrylate, an alkyl acrylate in which the alkyl group has 2–4 carbon atoms, a hydroxyalkyl acrylate or methacrylate in which the alkyl group has 1–4 carbon atoms and an $\alpha,\beta$-unsaturated monocarboxylic acid which is either acrylic acid or methacrylic acid.

Another preferred acrylic polymer used to form the novel coating of this invention contains 0–18% by weight styrene, 25–45% by weight methyl methacrylate, 40–43% by weight of an alkyl acrylate, 8–18% by weight of a hydroxy alkyl methacrylate, or a hydroxyalkyl acrylate having 2–4 carbon atoms in the alkyl group, 1–4% by weight of either acrylic acid or methacrylic acid.

Another particularly useful acrylic polymer is a blend of polymer of interpolymer A of 10–25% by weight styrene, 20–35% by weight methyl methacrylate, 35–45% by weight of butyl acrylate, 12–18% by weight hydroxyethyl acrylate and 1–4% by weight acrylic acid, and interpolymer B of 40–45% by weight methyl methacrylate, 38–48% by weight of butyl acrylate, 6–12% by weight of hydroxyethyl acrylate and 4–6% by weight of acrylic acid. The weight ratio of interpolymer A to interpolymer B is 1:4 to about 4:1.

Interpolymer C can also be blended with the above interpolymer A to form a particularly useful coating composition of this invention. Interpolymer C consists of about 40–50% by weight styrene, 40–50% by weight butyl acrylate, 6–12% by weight of hydroxyethylacrylate and 2–6% by weight acrylic acid. The weight ratio of interpolymer A to form a particularly useful coating composition of this invention is about 1:4 to about 4:1.

About 0.5–2% by weight of the coating composition solids (preferably, about 0.75–2.0% by weight) of cellulose acetate butyrate is used to form the novel coating composition of this invention. The cellulose acetate butyrate used in this invention has a butyryl content of about 35–55% by weight, and preferably, about 45–55% by weight, a hydroxyl content of about 0.8–2.0% by weight, and preferably about 1–1.9% by weight, and has a viscosity of about 0.01–5 seconds and preferably, a viscosity of 0.02–1 seconds determined according to the method of ASTM–D–1343–56. The hydroxyl content of the cellulose acetate butyrate used in the novel coating composition of this invention is critical. A hydroxyl content below 0.8 results in loss of adhesion to a repair coat or a recoat which later is applied and a hydroxyl content over 2% by weight results in incompatibility of the cellulose acetate butyrate with the acrylic polymer. Surprisingly, the cellulose acetate butyrate in the above amounts provides an acrylic coating to which lacquers of acrylic polymers, e.g., polymethyl methacrylate or of a nitrocellulose polymer, can be applied without sanding or priming the enamel coating and still have excellent adhesion to the untreated coating.

The other constituent of the novel coating composition of this invention is a nitrogen containing heat reactive condensate which gives the composition its thermosetting characteristic and improves the composition's hardness, solvent resistance, alkali and heat resistance. About 5–50% by weight, based on the weight of the film-forming polymer blend, of the heat reactive condensate is used and preferably, about 10–25% by weight of the heat reactive condensate is used.

Preferred heat reactive condensate used to prepare the novel coating composition of the invention are alkylated melamine formaldehyde resins or a mixture of an alkylated melamine formaldehyde resin and urea formaldehyde. These preferred alkylated melamine formaldehyde resins have 1–4 carbon atoms in the alkyl group and are those that are well known in the art. These resins are prepared by conventional techniques in which a lower alkyl alcohol such as methanol, ethanol, butanol, isobutanol, propanol, isopropanol and the like is reacted with the melamine formaldehyde resin to provide pendent alkoxy group or groups. One preferred melamine resin used in this invention because of its availability and since it forms a high quality coating composition is butylolated melamine formaldehyde.

Plasticizers can be used in the coating composition of this invention to impart desirable properties to the coating such as epoxidized soya bean oil, oil free and oil modified alkyds and polyesters, such as, polyorthophthalate esters, polyalkylene adipate esters or polyarylene adipate esters, benzylbutyl phthalate, dibutyl phthalate, triphenyl phosphate, 2-ethylhexylbenzyl phthalate, dicyclohexyl phthalate, diallyl phthalate, dibenzyl phthalate, butylcyclohexyl phthalate, mixed benzoic acid and fatty oil acid esters of pentaerythritol, poly(propylene adipate) dibenzoate, diethylene glycol dibenzoate, tetrabutylthiodisuccinate, butyl phthalyl butyl glycolate, acetyltributyl citrate, dibenzyl sebacate, tricresyl phosphate, toluene ethyl sulfonamide, the di-2-ethylhexyl ester of hexamethylene diphthalate, di(methylcyclohexyl)phthalate.

Pigments are used in the novel coating composition of this invention in the amounts of 0.1–20.0% pigment volume concentration, preferably, a pigment volume concentration of about 0.3–6.0% is used. Examples of the great variety of pigments which are used in the novel coating composition of this invention are metallic oxides, preferably titanium dioxide, zinc oxide, and the like, metal hydroxides, metal flakes, chromates, such as lead chromate, sulfides, sulfates, carbonates, carbon black, silica, talc, China clay, organic dyes and lead, iron blues, organic reds, maroons, and the like, organic dyes and lakes, etc.

The novel coating compositions of this invention can be applied to a variety of substrates, for example, wood, glass, plastics, such as polypropylene, styrene, copolymers of styrene, and the like, by any of the usual application methods, such as spraying, dipping, brushing, flow coating and the like. These coatings are baked at about 93–150° C. for about 15–60 minutes. The resulting coating is about 0.1–5 mils thick, preferably, 1–3 mils thick and can be rubbed or polished in accordance with conventional techniques, if desired, to improve smoothness or apparent gloss or both.

Preferably, the novel coating composition of this invention is applied over a suitable primed metal substrate. Typical alkyd primers or epoxy primers pigmented with iron oxide, carbon black, titanium dioxide and the like can be used. Also, the novel composition can be used directly over galvanized steel to form a durable coating.

The coating compositions of this invention find utility in coating articles such as in the auto industry which are mass produced.

Particular properties which make the enamel coating compositions of this invention attractive to the auto industry are the recoatability of a damaged area of the novel enamel coating of this invention with a lacquer without surface preparation steps of sanding or applying a sealer coat. Also, the novel enamel coating composition of this invention can have stripes or other decorations applied to the enamel coat without surface preparation and still provide an excellent appearance and have a high level of adhesion.

The following examples illustrate the invention. All parts and percentages are by weight unless indicated otherwise.

EXAMPLE 1

A coating composition is formed by first preparing the following polymer A solution:

| Portion 1: | Parts by weight |
|---|---|
| Hydrocarbon solvent (boiling point 150–190° C., aniline point 28° C.) | 1537 |
| Butyl alcohol | 615 |
| Ethylene glycol monoethyl ether acetate | 830 |
| Portion 2: | |
| Styrene monomer | 738 |
| Methyl methacrylate monomer | 1245 |
| Butyl acrylate monomer | 1845 |
| Hydroxyethyl acrylate monomer | 680 |
| Acrylic acid monomer | 105 |
| Ditertiary butyl peroxide | 92 |
| Portion 3: | |
| Butyl acetate (90% n-butyl acetate in 10% butyl alcohol) | 698 |
| Total | 8385 |

Portion 1 is premixed and then charged into a reaction vessel equipped with a stirrer, a thermometer and a heating element and the ingredients are heated to 130° C. Portion 2 is premixed and then added to the reaction mixture and the reaction mixture is heated to its reflux temperature of about 135° C. and held at this temperature for about 3.5 hours. The resulting polymer A solution has a polymer solids content of 55% and a Gardner Holdt viscosity measured at 25° C. of about W to Y. The resulting polymer A has the following composition: styrene/methyl methacrylate/butyl acrylate/hydroxyethyl acrylate/acrylic acid in a weight ratio of 16/27/40/14.5/2.5.

The polymer has an acid number of about 16–20, a glass transition temperature of about 32° C. and a relative viscosity of about 1.09 measured in ethylene dichloride at 25° C. measured according to ASTM–D–445–46–T, Method B.

Polymer B solution is formed by blending the following ingredients:

| Portion 1: | Parts by weight |
|---|---|
| Hydrocarbon solvent (described in Example 1) | 1891 |
| Ethylene glycol monoethyl ether acetate | 1162 |
| Butyl alcohol | 231 |
| Portion 2: | |
| Methyl methacrylate monomer | 2321 |
| Butyl acrylate monomer | 2220 |
| Hydroxyethylacrylate monomer | 420 |
| Acrylic acid | 200 |
| Ditertiary butyl peroxide | 155 |
| Total | 8600 |

Portion 1 is premixed and charged into a reaction vessel as described in Example 1 and heated to 130° C. Portion 2 is then premixed and charged into the reaction vessel and the ingredients are heated to the reflux temperature of 135° C. for about 3.5 hours. The resulting polymer B solution has a polymer solids content of about 60% and a Gardner Holdt viscosity of about Z to $Z_2$ measured at 25° C.

The resulting polymer B has the following composition: methyl methacrylate/butyl acrylate/hydroxyethyl acrylate/acrylic acid in a weight ratio of 45/43/8/4. The polymer has an acid number of 25–30, a glass transition temperature of about 16° C. and a relative viscosity of about 1.07 measured in ethylene dichloride solvent at 25° C. and according to ASTM D–445–46–T, Method B.

A cellulose acetate butyrate solution is prepared by blending the following ingredients:

| Portion 1: | Parts by weight |
|---|---|
| Acetone | 200 |
| Cellulose acetate butyrate solution (EAB–551–D–0.2) (55% solids in a 2:1 toluene/acetone solvent mixture, the CAB has a butyryl content of 53%, a hydroxyl content of 1.7% and has a 0.2 second viscosity at 25% polymer solids in a solution of acetone and toluene according to ASTM–D–1343–56) | 200 |
| Portion 2: | |
| Toluene | 600 |
| Total | 1000 |

Portion 1 is mixed thoroughly and Portion 2 is added and mixed with Portion 1. The resulting CAB solution has a polymer solids content of 20%.

A pigment dispersion is prepared by blending the following ingredients:

| Portion 1: | Parts by weight |
|---|---|
| Polymer A solution (55% polymer solids) | 3250 |
| Toluene | 730 |
| Portion 2: | |
| Aluminum paste (65.5% aluminum solids in which the aluminum is a medium sized particle which is non-leafing dispersed in an organic solvent) | 2320 |
| Portion 3: | |
| Polymer A solution (55% polymer solids) | 3000 |
| Toluene | 700 |
| Total | 10,000 |

Portion 1 is mixed for 15 minutes using a high speed mixer. Portion 2 is added and the dispersion is mixed for 3 hours and Portion 3 is added and the dispersion is mixed for an additional hour. The resulting dispersion has a solids content of 50.2%.

A coating composition is then formulated by blending the following ingredients:

| | Parts by weight |
|---|---|
| Polymer B solution (60% polymer solids) | 3528 |
| Butylated melamine formaldehyde resin solution (55% solids solution in n-butanol) | 2347 |
| Cellulose acetate butyrate solution (20% polymer solids) | 225 |
| Methanol | 390 |
| Toluene | 935 |
| Anhydrous isopropanol | 500 |
| Pigment dispersion (50.2% solids) | 2567 |
| Total | 10,492 |

The above prepared coating composition is reduced with toluene to a viscosity of 22 seconds No. 2 Zahn Cup measured at 25°C. and is sprayed onto suitably primed panels. Each panel is baked for about 50 minutes at about 121° C. which, in each case, results in a fully cured film about 1.8 mils thick that has a high gloss, excellent hardness, is resistant to blistering by high humidity, has excellent resistance to water soaking, is highly chip resistant and is resistant to solvents and to weathering.

Two of the above prepared panels after standing for 4 hours are recoated, one with a lacquer of polymethyl methacrylate and the other with a nitrocellulose lacquer and allowed to air dry.

The adhesion of the lacquer to the enamel surface is shown by a tape adhesion test. In this test, the coating on the panel is scribed to the metal with two 45 degree cuts. Standard Scotch tape is applied over the scribed cuts and the tape is smoothed and then sharply pulled free. If any of the lacquer is peeled off by the tape, the adhesion is not satisfactory. With each of the above prepared panels, none of the lacquer coating was peeled off indicating excellent adhesion.

An enamel coating composition is prepared using the same constituents except the cellulose acetate butyrate solution is omitted from the enamel. This composition is reduced to spray solids and sprayed onto an untreated panel coated with the same primer as above. The panel is baked as above giving a film 1.8 mils thick and a lacquer of polymethyl methacrylate and nitrocellulose lacquer are sprayed onto separate panels and air dried as above. In each case, the lacquer had poor adhesion to the enamel substrate as shown by the above tape adhesion test in which portions of the lacquer coating were peeled off.

EXAMPLE 2

A coating composition is formed by first preparing the following polymer C solution:

| Portion 1: | Parts by weight |
| --- | --- |
| Hydrocarbon solvent (boiling point 150–190° C., aniline point 28° C.) | 2910 |
| Butyl alcohol | 220 |
| Portion 2: | |
| Styrene monomer | 2210 |
| Butylacrylate monomer | 2113 |
| Hydroxyethyl acrylate monomer | 400 |
| Acrylic acid monomer | 190 |
| Ditertiary butyl peroxide | 147 |
| Total | 8190 |

Portion 1 is premixed and then charged into a reaction vessel equipped as described above.

The ingredients are heated to 140° C. and then Portion 2 is premixed and is added to the reaction vessel. The reaction mixture is heated to its reflux temperature of about 140° C. and held at this temperature for about 3.5 hours. The resulting polymer C solution has a polymer solids content of about 60% and a Gardner Holdt viscosity of about Y to Z measured at 25° C.

The resulting polymer C has the following composition: styrene/butyl acrylate/hydroxyethyl acrylate/acrylic acid in a weight ratio of 45/43/8/4. The polymer has an acid number of 25–30, a glass transition temperature of about 15° C. and a relatively viscosity of about 1.06 measured in ethylene dichloride at 25° C. measured according to ASTM D–445–46–T Method B.

A pigment dispersion is prepared by blending the following ingredients:

| Portion 1: | Parts by weight |
| --- | --- |
| Polymer C solution (60% polymer solids) | 90 |
| Toluene | 50 |
| Anhydrous isopropanol | 25 |
| Naphtha | 75 |
| Portion 2: | |
| Chrome yellow pigment—fine yellow pigment which is the coprecipitate of lead chromate and lead sulphate | 600 |
| Portion 3: | |
| Polymer C solution (60% polymer solids) | 160 |
| Total | 1000 |

Portion 1 is charged into a steel vessel and mixed for 15 minutes, Portion 2 is added and the dispersion is mixed for 1 hour and Portion 3 is added and the dispersion is mixed for an additional hour. The dispersion is ground 1 pass in an 8 gallon sand mill at a speed of 20 gallons per hour with a maximum temperature of 49° C.

A coating composition is then formulated by blending the following ingredients:

| | Parts by weight |
| --- | --- |
| Polymer A (55% polymer solids) | 751 |
| Polymer C solution (60% polymer solids) | 4009 |
| Butylated melamine formaldehyde (55% solids solution in n-butanol) | 2444 |
| Methanol | 391 |
| Anhydrous isopropanol | 501 |
| Hydrocarbon solvent—boiling point 150–190° C., aniline point 28° C. | 467 |
| Cellulose acetate butyrate solution (prepared in Example 1) | 250 |
| Yellow pigment dispersion (75.25 solids) | 600 |
| Total | 9413 |

The above prepared coating composition is reduced with toluene to a viscosity of 22 seconds No. 2 Zahn Cup measured at 25° C. and is sprayed onto suitably primed panels. Each panel is baked for about 50 minutes at about 121° C. which, in each case, results in a fully cured film about 1.8 mils thick that has a high gloss, excellent hardness, is resistant to blistering by high humidity, has excellent resistance to water soaking, is highly chip resistant and is resistant to solvents and to weathering.

The adhesion of a lacquer of polymethyl methacrylate and a lacquer of nitrocellulose to the above prepared panels is determined according to the procedure of Example 1. In each case, none of the lacquer coating was removed from the enamel substrate indicating excellent adhesion.

An enamel coating composition is prepared using the same constituents except the cellulose acetate butyrate solution is omitted from the enamel. This composition is reduced to spray solids and sprayed onto an untreated panel coated with the same primer as above. The panel is baked as above giving a film 1.8 mils thick and a lacquer of polymethyl methacrylate and nitrocellulose lacquer are sprayed onto separate panels and air dried as above. In each case, the lacquer had poor adhesion to the enamel substrate as shown by the above tape adhesion test in which portions of the lacquer coating were peeled off.

EXAMPLE 3

A coating composition is prepared by blending the following ingredients:

| | Parts by weight |
| --- | --- |
| Polymer D solution (50% polymer solids in which the polymer is 30% styrene, 26.4% methyl methacrylate, 25% 2-ethylhexyl acrylate, 16% hydroxy butyl methacrylate and 12.6% methacrylic acid) | 400 |
| Polymer E solution (50% polymer solids in which the polymer is 17% styrene, 26% methyl methacrylate, 36% 2-ethylhexyl acrylate, 18% hydroxyl butyl methacrylate and 3% methacrylic acid) | 600 |
| White pigment dispersion (75% solids) | 333 |
| Cellulose acetate butyrate solution (described in Example 1) | 39 |
| Methanol | 40 |
| Xylol | 60 |
| Methylisobutyl ketone | 100 |
| Total | 1527 |

Polymer solutions D and E are prepared by using the same polymerization procedure as used to prepare polymer solution A of Example 1, except the above monomers in the aforementioned ratio were used instead of the monomers used to prepared Polymer A.

The white pigment dispersion is prepared by blending the following ingredients:

Portion 1: Parts by weight
Polymer E solution (50% polymer solids) ____ 30
Xylol _____ 10
Portion 2:
Titanium dioxide pigment (prepared by the chloride process) _____ 60

Total _____ 100

Portion 1 is mixed for 15 minutes and Portion 2 is added and the dispersion is mixed for 30 minutes. Then the dispersion is ground 1 pass in a 30 gallon sand mill using a 50:50 ratio of sand to dispersion at a speed of 75 gallons/hour with a maximum temperature of 60° C.

The above prepared coating composition is reduced with toluene to a 22 second No. 2 Zahn Cup viscosity and is sprayed onto suitably primed panels. Each panel is baked for about 50 minutes at about 121° C. which, in each case, results in a fully cured film about 1.8 mils thick that has a high gloss, excellent hardness, is resistant to blistering by high humidity, has excellent resistance to water soaking, is highly chip resistant and is resistant to solvents and to weathering.

The adhesion of a lacquer of polymethyl methacrylate and a lacquer of nitrocellulose to the above prepared panels is determined according to the procedure of Example 1. In each case, none of the lacquer coating was removed from the enamel substrate indicating excellent adhesion.

EXAMPLE 4

To five commercially available thermosetting acrylic enamels containing an acrylic polymer of an alkyl methacrylate or an alkyl ethyl acrylate, hydroxyalkyl methacrylate or acrylate and an α,β-unsaturated monocarboxylic acid, 1% by weight based on the weight of total solids of a cellulose acetate butyrate solution prepared in Example 1 is added. Each of these compositions is reduced to spray solids and each is sprayed onto suitably primed panels and baked until fully cured.

The adhesion of a lacquer of polymethyl methacrylate and a lacquer of nitrocellulose to the above prepared panels is determined according to the procedures of Example 1. In each case, none of the lacquer coating was removed from the enamel substrate indicating excellent adhesion.

In each case, the cellulose acetate butyrate is omitted from the commercial acrylic enamel. This composition is reduced to spray solids and sprayed onto an untreated panel coated with the same primer as above. The panel is baked as above giving a film 1.8 mils thick and a lacquer of polymethyl methacrylate and nitrocellulose lacquer are sprayed onto separate panels and air dried as above. In each case, the lacquer had poor adhesion to the enamel substrate as shown by the above tape adhesion test in which portions of the lacquer coating were peeled off.

What is claimed is:

1. A liquid coating composition comprising 10-60% by weight of a film-forming polymer blend and a solvent for said polymer blend wherein the polymer blend consists essentially of (1) 50-80% by weight, based on the weight of the polymer blend, of an acrylic polymer of a mixture which consists of 0-6% by weight based on the weight of the acrylic polymer of an α,β-ethylenically unsaturated monocarboxylic acid,
an acrylic ester selected from the group consisting of an alkyl methacrylate, an alkyl acrylate, and a mixture thereof wherein the alkyl group contains 1-8 carbon atoms, and a hydroxy containing constituent selected from the group consisting of a hydroxyalkyl acrylate and a hydroxy alkyl methacrylate and a blend thereof, wherein the alkyl group contains 1-8 carbon atoms, wherein said acrylic polymer has a relative viscosity of 1.04-1.14 measured at 25° C. in ethylene dichloride according to ASTM D-445-46-T, Method B;

(2) 0.5-2% by weight, based on the weight of the polymer blend, of cellulose acetate butyrate having a butyryl content of 35-55% by weight, a hydroxyl content of about 0.8-2.0% by weight and a viscosity of about 0.01-5 seconds at 25° C. measured according to ASTM D-1343-56; and (3) 5-50% by weight, based on the weight of the polymer blend, of a melamine formaldehyde resin which has been at least partially reacted with an aliphatic monohydric alcohol having 1-4 carbon atoms.

2. The coating composition of claim 1 which contains pigment in a pigment volume concentration of 0.1 to 20% by weight based on the weight of the coating composition.

3. The coating composition of claim 1 in which the acrylic polymer is of a mixture which consists essentially of methyl methacrylate, an alkylacrylate wherein the alkyl group has 2-4 carbon atoms, a hydroxy containing compound selected from the group consisting of a hydroxyalkyl methacrylate and a hydroxyalkyl acrylate in which the alkyl group has 1-4 carbon atoms and an α,β-unsaturated monocarboxylic acid selected from the group consisting of acrylic acid and methacrylic acid.

4. The coating composition of claim 3 in which the cellulose acetate butyrate has a hydroxy content of 1.0-1.9% by weight, a butyryl content of 45-55% by weight and a relative viscosity at 25° C. of 0.2-1 seconds measured in ethylene dichloride.

5. The coating composition of claim 4 in which the acrylic polymer contains up to 50% by weight, based on the weight of the acrylic polymer, of styrene.

6. The coating composition of claim 2 in which the acrylic polymer is a blend of polymers which consist essentially of interpolymer B which consists of 40-50% by weight based on the weight of interpolymer A, of styrene, 20-35% by weight of methyl methacrylate, 35-45% by weight of butyl acrylate, 12-18% by weight of hydroxyethyl acrylate and 1-4% by weight acrylic acid, and interpolymer B which consists of 40-50% by weight of interpolymer B of methyl methacrylate, 38-48% butyl acrylate, 6-12% by weight of hydroxyethyl acrylate and 4-6% by weight of acrylic acid, and in which the cellulose acetate butyrate has a hydroxy content of 0.8 to 2.0% by weight, a butyryl content of 45-55% by weight, and a relative viscosity at 25° C. of 0.2-1 seconds measured in ethylene dichloride and in which the melamine formaldehyde resin is a butylolated melamine formaldehyde.

7. The coating composition of claim 2 in which the acrylic polymer is a blend of polymer which consists essentially of:

interpolymer A which consists of 10-25% by weight, based on the weight of interpolymer A, of styrene, 20-35% by weight of methyl methacrylate, 35-45% by weight of butyl acrylate, 12-18% by weight hydroxyethyl acrylate and 1-4% by weight of acrylic acid, and interpolymer C which consists of 40-50% by weight, based on the weight of interpolymer C, of styrene, 40-50% by weight of butyl acrylate, 6-12% by weight of hydroxyethyl acrylate and 2-6% by weight of acrylic acid, and in which the cellulose acetate butyrate has a hydroxy content of 0.8 to 2.0% by weight, a butyryl content of 45-55% by weight, and a relative viscosity at 25° C. of 0.2-1 seconds measured in ethylene dichloride and in which the melamine formaldehyde resin is a butylolated melamine formaldehyde.

8. A metal substrate coated with 0.1–5 mil dried coalesced layer of the coating composition of claim 1.

9. A ferrous metal substrate having a pigmented primer layer coated with a 0.1–5 mil dried coalesced layer of the coating composition of claim 1.

10. A plastic substrate reinforced with glass fibers coated with a 0.1–5 mil dried coalesced layer of the coating composition of claim 1.

References Cited

UNITED STATES PATENTS

| | | | |
|---|---|---|---|
| 2,849,409 | 8/1958 | Evans | 260—16 |
| 3,311,583 | 3/1967 | Bearden | 260—80.75 |
| 3,338,860 | 8/1967 | Vasta | 260—80.75 |
| 3,370,025 | 2/1968 | Salo et al. | 260—16 |
| 3,411,941 | 11/1968 | Lowe et al. | 260—15 |

FOREIGN PATENTS

| | | | |
|---|---|---|---|
| 939,211 | 10/1963 | Great Britain | 260—80.75 |

OTHER REFERENCES

Paint Technology, "Practical . . . Acrylic Resins," Stewart, July 1966, pp. 19–20, 23–26 and 28–31.

WILLIAM H. SHORT, Primary Examiner

E. WOODBERRY, Assistant Examiner

U.S. Cl. X.R.

117—132 B, 138.8 E, 161 C; 260—15

PO-1050
(5/69)

UNITED STATES PATENT OFFICE
CERTIFICATE OF CORRECTION

Patent No. 3,671,293  Dated June 20, 1972

Inventor(s) Leonard A. Walle

It is certified that error appears in the above-identified patent and that said Letters Patent are hereby corrected as shown below:

Claim 6, column 10, line 42, after "interpolymer" delete "B" and insert -- A --; after "of" delete "40-50%" and insert -- 10-25% --.

Signed and sealed this 2nd day of January 1973.

(SEAL)
Attest:

EDWARD M. FLETCHER, JR.
Attesting Officer

ROBERT GOTTSCHALK
Commissioner of Patent